(12) United States Patent
Juriga

(10) Patent No.: US 8,091,684 B2
(45) Date of Patent: Jan. 10, 2012

(54) LOW MASS ACOUSTICALLY ENHANCED FLOOR CARPET SYSTEM

(75) Inventor: Duane M. Juriga, Bloomfield Hills, MI (US)

(73) Assignee: Futuris Automotive Interiors (US), Inc.

( * ) Notice: Subject to any disclaimer, the term of this patent is extended or adjusted under 35 U.S.C. 154(b) by 6 days.

(21) Appl. No.: 12/048,936

(22) Filed: Mar. 14, 2008

(65) Prior Publication Data

US 2008/0223654 A1 Sep. 18, 2008

Related U.S. Application Data

(60) Provisional application No. 60/894,713, filed on Mar. 14, 2007.

(51) Int. Cl.
*E04B 1/82* (2006.01)

(52) U.S. Cl. .................. 181/286; 181/284; 296/39.3

(58) Field of Classification Search ............ 181/286, 181/284, 287, 30; 296/39.3; 52/144, 145
See application file for complete search history.

(56) References Cited

U.S. PATENT DOCUMENTS

| | | | |
|---|---|---|---|
| 3,922,454 A * | 11/1975 | Roecker ................. | 428/95 |
| 4,313,524 A * | 2/1982 | Rose ..................... | 181/291 |
| 4,671,981 A | 6/1987 | McLaughlin | |
| 4,716,065 A | 12/1987 | McLaughlin | |
| 4,748,063 A | 5/1988 | Reuben | |
| 4,804,567 A | 2/1989 | Reuben | |
| 4,810,546 A | 3/1989 | McLaughlin | |
| 4,829,627 A | 5/1989 | Altus et al. | |
| 4,844,765 A | 7/1989 | Reith | |
| 4,968,548 A | 11/1990 | Gibson et al. | |
| 5,003,664 A | 4/1991 | Wong | |
| 5,100,195 A | 3/1992 | Patel | |
| 5,149,572 A | 9/1992 | Gaggero et al. | |
| 5,439,725 A | 8/1995 | Roberts | |
| 5,472,763 A | 12/1995 | Schwarz et al. | |
| 5,498,667 A | 3/1996 | David et al. | |
| 5,532,035 A | 7/1996 | Corbin et al. | |
| 5,538,776 A | 7/1996 | Corbin et al. | |
| 5,573,294 A | 11/1996 | Mack | |

(Continued)

FOREIGN PATENT DOCUMENTS

EP 1985737 10/2008

(Continued)

OTHER PUBLICATIONS

Chuah, H.H., et al., CORTERRA® POLY (Trimethylene Terephthalate) A New Performance Carpet Fiber, International Fiber Journal, Oct. 1995, pp. 50-52.

(Continued)

*Primary Examiner* — Forrest M Phillips
(74) *Attorney, Agent, or Firm* — Harness, Dickey & Pierce, P.L.C.

(57) ABSTRACT

A low mass acoustically enhanced floor carpet system for vehicles. In a first embodiment, the carpet assembly comprising a face layer and an opposite lower fiber mat. The carpet assembly further including a primary backing if the face layer is tufted, a back coating layer, an upper fiber mat, and a perforated film layer all in between the face layer and the lower fiber mat. The perforated film layer providing for enhanced sound absorption. In an alternate embodiment, the carpet assembly comprising a face layer, an insulator pad opposite the face layer; a back coating, a perforated film layer, and an insulator pad all between the face layer and the insulator pad.

15 Claims, 2 Drawing Sheets

U.S. PATENT DOCUMENTS

| | | | |
|---|---|---|---|
| 5,630,896 | A | 5/1997 | Corbin et al. |
| 5,749,993 | A | 5/1998 | Denney et al. |
| 5,919,540 | A | 7/1999 | Bailey |
| 6,145,911 | A | 11/2000 | Sturt et al. |
| 6,155,629 | A | 12/2000 | Sherman |
| 6,291,048 | B1 | 9/2001 | Jerdee et al. |
| 6,605,333 | B2 | 8/2003 | Ferreira et al. |
| 6,736,442 | B2 | 5/2004 | Gebreselassie et al. |
| 6,986,547 | B2 | 1/2006 | Parrish |
| 7,097,723 | B2 | 8/2006 | Allison et al. |
| 7,125,595 | B2 | 10/2006 | Kobayashi |
| 7,244,333 | B2 | 7/2007 | Hutchison et al. |
| 7,351,465 | B2 | 4/2008 | Jerdee et al. |
| 2001/0051248 | A1 | 12/2001 | Jerdee et al. |
| 2002/0005250 | A1 | 1/2002 | Jerdee et al. |
| 2002/0058113 | A1 | 5/2002 | Dimone |
| 2003/0085383 | A1 | 5/2003 | Burnell-Jones |
| 2003/0085384 | A1 | 5/2003 | Burnell-Jones |
| 2003/0157319 | A1 | 8/2003 | Boyle et al. |
| 2004/0001934 | A1 | 1/2004 | Young |
| 2004/0020183 | A1 | 2/2004 | Bowers |
| 2004/0020184 | A1 | 2/2004 | Bowers |
| 2004/0037995 | A1* | 2/2004 | Nicolai et al. .................. 428/95 |
| 2004/0062905 | A1 | 4/2004 | Sehmer et al. |
| 2004/0071963 | A1 | 4/2004 | Boyle et al. |
| 2004/0151870 | A1* | 8/2004 | Theiss .............. 428/95 |
| 2004/0198120 | A1 | 10/2004 | Scott et al. |
| 2004/0229535 | A1 | 11/2004 | Tang |
| 2004/0231915 | A1* | 11/2004 | Thompson et al. ........... 181/290 |
| 2005/0064779 | A1 | 3/2005 | Allison et al. |
| 2005/0100733 | A1 | 5/2005 | Foss et al. |
| 2005/0147786 | A1 | 7/2005 | Clark et al. |
| 2005/0147787 | A1 | 7/2005 | Bailey et al. |
| 2005/0154118 | A1 | 7/2005 | Hayes et al. |
| 2005/0233660 | A1 | 10/2005 | Kimbrell et al. |
| 2006/0003142 | A1 | 1/2006 | Shimizu et al. |
| 2006/0036012 | A1 | 2/2006 | Hayes et al. |
| 2006/0083710 | A1 | 4/2006 | Joerger et al. |
| 2006/0135668 | A1 | 6/2006 | Hayes |
| 2006/0162997 | A1 | 7/2006 | Cooksey et al. |
| 2006/0240217 | A1 | 10/2006 | Foss et al. |
| 2007/0059844 | A1 | 3/2007 | Harper et al. |
| 2007/0082172 | A1 | 4/2007 | Derbyshire et al. |
| 2007/0092687 | A1 | 4/2007 | Tsai |
| 2007/0212531 | A1 | 9/2007 | McIntyre et al. |
| 2007/0212963 | A1 | 9/2007 | Keep |
| 2007/0254130 | A1 | 11/2007 | Cheek |
| 2008/0001431 | A1 | 1/2008 | Thompson et al. |
| 2008/0017294 | A1 | 1/2008 | Bailey et al. |
| 2008/0045102 | A1 | 2/2008 | Keep |
| 2008/0075915 | A1 | 3/2008 | Wening et al. |
| 2008/0113146 | A1 | 5/2008 | Wright et al. |
| 2008/0116129 | A1 | 5/2008 | Oosterbroek et al. |
| 2008/0128201 | A1* | 6/2008 | Yamaguchi et al. .......... 181/286 |
| 2008/0213531 | A1 | 9/2008 | Goffing et al. |
| 2008/0220199 | A1 | 9/2008 | Locher et al. |

FOREIGN PATENT DOCUMENTS

| | | |
|---|---|---|
| JP | 06072223 A | 3/1994 |
| JP | 2003-104135 | 4/2003 |
| WO | WO2008/009370 | 1/2008 |

OTHER PUBLICATIONS

Zeng, Y., et al., Study on the Tensile Performance of PTT Fiber, Modern Applied Science, vol. 3, No. 1, Jan. 2009, pp. 135-138.

Schwartz, S.A., et al., PET modification with MPDiol glycol, Chemical Fibers International, vol. 53, Dec. 2003, pp. 445, 446, 448, 449.

Luo, et al., External Configuration and Crimp Parameters of PTT (Polytrimethylene terephthalate)/PET (Polyethylene terephthalate) Conjugated Fiber, Fibers and Polymers 2009, vol. 10., No. 4, pp. 508-512.

DuPont® Rynite® PET thermoplastic polyester resin, Start with DuPont, Molding Guide, 7 Chapters, 27 pgs.

* cited by examiner

LOW MASS ACOUSTICALLY ENHANCED FLOOR CARPET SYSTEM

RELATED APPLICATIONS

This application claims the benefit of, and priority to, U.S. Provisional Patent Application No. 60/894,713, filed Mar. 14, 2007, which is incorporated by reference herein.

BACKGROUND OF THE INVENTION

The present invention is directed to an acoustically enhanced carpet system and more specifically to a low mass acoustically enhanced carpet system for the automobile industry and a method of forming the same.

In the automotive market there are a variety of factors and trends that are critical to manufacturers as a result of consumer demand. This leads to focused research and development into these areas. One such consideration is comfort. Comfort is one of the forefront factors that are identified by consumers as being important in their consideration of one vehicle over another. The general term "comfort" comprises many different factors some of which are the usual factors, such as seat comfort, but some less obvious factors are now becoming more important to consumers and hence to the automobile companies and suppliers. One such consideration that is gaining in importance is the acoustic performance of the vehicle and as such ways to dampen the noise within the vehicle compartment that is often caused by outside noises such as road noise, engine noise, vibrations, etc is desirable.

Various acoustical materials are also used to reduce the noise within a vehicle compartment by acoustical absorption. These materials are used in dashboards, wheel wells, trunk compartments, under hoods, headliners, and especially carpeting floor panels. Unfortunately, the acoustic properties of the carpeting floor panels are not the only considerations or functionality taken into account with respect to the carpeting panels because it is necessary to consider other factors such as the cost and weight of the carpeting.

The automotive industry standard for floor carpets worldwide consists of two primary constructions to address interior vehicle acoustics. With reference to FIG. 1A, construction of a first floor carpet system 10 consists of a heavy mass floor system 12, including a tufted nylon/needle punch non-woven carpet 14 that is back-coated with a heavy layer 16 of PVC (polyvinyl chloride), EVA (ethylene vinyl acetate), or PE (polyethylene). A "heavy layer" is defined as a back coating with an application great enough to create an acoustic barrier. The back coating application can usually range from 400-800 g/sq m.

The "heavy layer" 16 acts as a barrier preventing any vehicle air or structure borne noises from entering into the vehicle cabin through the flooring system. Directly beneath the barrier layer is an additional insulator pad 18 which acts as a de-coupler between the carpet system 10 and the vehicle body. This type of carpet system 10 can be a highly effective acoustic solution, but adds significant cost and weight to the vehicle. The "mass backed" carpet systems have limited ability to address specific air borne noise issues in the vehicles interior since it relies on the carpet "face weight" to provide most of the floor's acoustical absorption.

With reference to FIG. 1B, construction of a second floor carpet system 20 consists of a lightweight porous floor system 22 generally formed of a tufted nylon or needle punch non-woven carpet 24 that is applied with a lightweight back coating of latex or PE 26 which is porous enough to allow sound transmissibility through it. Directly beneath this floor carpet construction usually consists of a dual layer/dual density fiber system 28 consisting of a thinly compressed layer and highly lofted resonated/synthetic fiber sandwich as shown or a single layer of highly lofted synthetic fiber (cross or vertically lapped) (not shown). The function of both of these types of constructions is to provide an acoustic system which absorbs noises entering or already in the interior vehicle cabin rather than keeping noise out. The benefits of this type of system are lower vehicle weight and cost, but these types of systems are more sensitive to water intrusion and microbial issues such as mold and mildew.

The light weight porous flooring systems 20 vary in acoustical performance. A dual density/dual layer system provides better lower frequency absorption than conventional heavy layer/mass backed carpet systems but do not perform as well at higher frequencies. Single layer highly lofted fiber (cross or vertically lapped) systems do not provide as much sound absorption at lower frequencies as dual/density but have excellent higher frequency absorption.

Traditional vehicle "sound mapping" has highlighted that most vehicle interior noises radiating from the floor, foot-well and tunnel areas are concentrated in the lower to mid frequency ranges (800 to 2000 Hz). This frequency range is especially difficult to address with acoustic attenuation for either the currently established heavy layer or lightweight porous flooring systems. The lack of acoustical performance in the 800-2000 Hz frequency range is characteristic of most synthetic fibers (PE, PP, PET & Nylon).

Therefore there it is desired in the art to have a low weight, low density carpet application that attains acoustical performance at all ranges while remaining a cost effective solution. It is also desired to have a carpet system that resists water absorption/pass-through and is comprised of recycled materials. These and other problems are overcome by the following novel disclosure.

SUMMARY OF THE INVENTION

In view of the above discussion, a low mass acoustically enhanced floor carpet assembly is provided. According to one exemplary embodiment of the present invention, the carpet is comprised of a face layer, a back coating layer, an upper fiber mat, a perforated film layer, and a lower fiber mat wherein the perforated film layer provides acoustic absorption while resisting water absorption.

According to another exemplary embodiment of the present invention, a lightweight carpet assembly for improving acoustic absorption comprising a face layer, a back coating, a film layer, and an insulator pad is provided. The film layer is perforated to allow for acoustic absorption and turnability by varying the perforation shape, size, and/or pattern. The insulator pad provides beneficial acoustical abortion as well as provides an anti-slide surface to prevent the carpet assembly from sliding when used as a floor mat or a foot well insert.

DESCRIPTION OF THE DRAWINGS

The above, as well as other advantages of the present invention will become readily apparent to those skilled in the art from the following detailed description of a preferred embodiment when considered in the light of the accompanying drawings in which.

DESCRIPTION OF THE PREFERRED EMBODIMENT

The present invention relates generally to vehicles and, more particularly, low mass acoustically enhanced floor carpet systems for vehicles. The present invention comprises a lightweight acoustically enhanced flooring system designed to improve sound attenuation in the critical frequency ranges which is typically identified as the 800-2000 Hz range, improve moisture resistance compared to traditional light weight flooring systems and provide a completely recyclable flooring system. As will be described in more detail hereinbelow, the novel use of a film or perforated film layer in a carpet system not only enhances and improves sound absorption at frequency ranges not previously accomplished through prior art fiber technology but also reduces the risk of water absorption and provides a bonding function for other components of the composite. A further advantage of the floor carpet system of the present invention is that while the use of the carpet system in automotive applications is disclosed herein, the potential exists for utilization in non-automotive applications such as commercial or residential carpets, or in other vehicles.

Figure 1A:
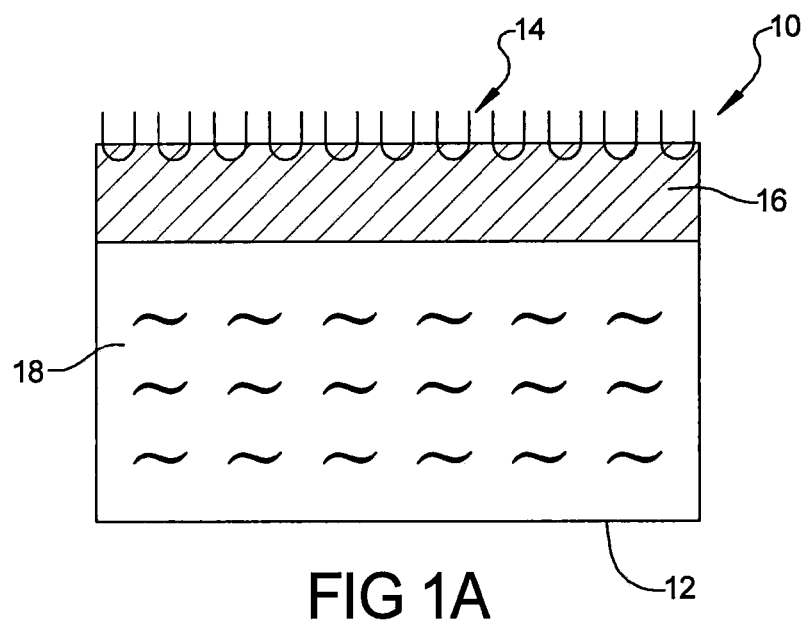
FIGS. 1A and B illustrate the carpet structure of the prior art.
Figure 1B:
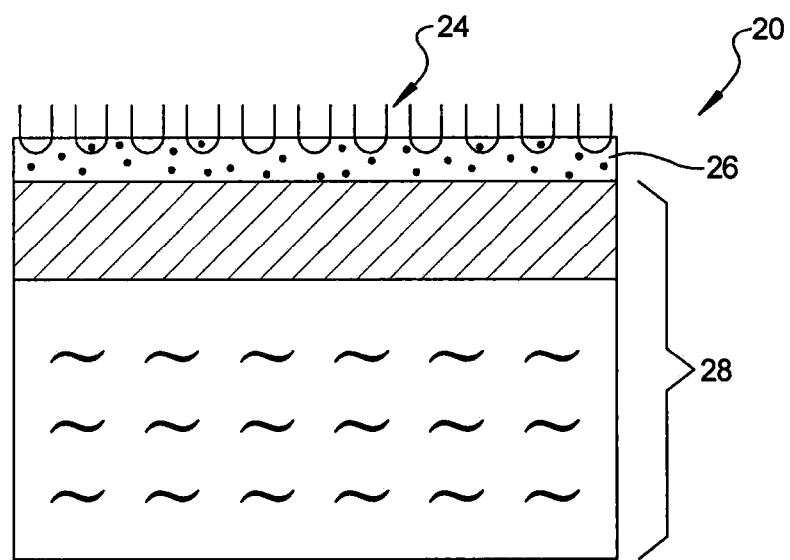
Figure 2:
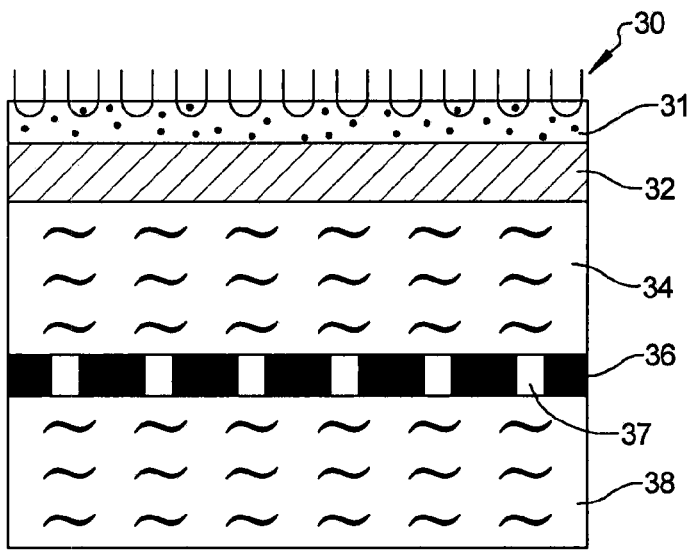
FIG. 2 is a cross sectional view of a first preferred embodiment of the present invention.

FIGS. 1A and 1B have been described in detail above. In comparison to these prior art illustrations and with reference to FIG. 2, a first preferred embodiment of the novel carpet system of the present invention is illustrated. As will be described in more detail herein, the first preferred embodiment as shown in FIG. 2 consists of a carpet face 30, a primary backing 31, a back coating 32, an upper fiber mat 34, a film layer 36, and a lower fiber mat 38.

The carpet face 30 which provides the decorative appearance to the carpet, is preferably constructed of either a non-woven needle-punch polyester such as polyethylene terephthalate (PET), tufted nylon, or tufted PET yarns. The process of tufting the PET may be similar to that as disclosed in U.S. patent application Ser. No. 12/043,723 filed on Mar. 6, 2008, which is incorporated by reference herein. In accordance with the recyclability object of the present invention, the needle-punch non-woven PET polyester or tufted PET are the preferred constructions due to PET being a recycled product. The carpet face 30 weights for a light-weight carpet construction in accordance with the preferred embodiment preferably ranges from 300-450 g/sq m. With respect to sound absorption, it has been found that the carpet face 30 typically contribute to the absorption of the mid and high frequency sounds.

The next layer, the back coating 32 forms the second layer of the carpet construction. In the case of a carpet system that utilizes tufted nylon or PET yarns, the fibers of the carpet face 30 are typically woven through a primary backing 31 that usually consists of polyester, PET or another synthetic fiber blend. The tufted fibers are secured to the primary by the back coating 32. The back coating 32 preferably consists of either latex, frothed PE, or acrylic latex. In accordance with the preferred embodiment of the present invention, in order to insure porosity, the coating preferably should remain within the 270-340 g/sq m range. Again, to attain the object of recyclability the back coating 32 consists of PE.

In the case of a non-tufted carpet construction such as a non-woven needle-punch polyester or PET, the back coating 32 is extruded directly to the carpet facing 30. To insure porosity, in accordance with the preferred embodiment of the present invention, the preferred back coating 32 materials and process are the same as for tufted constructions as described herein.

The upper fiber mat 34 is the third layer of the carpet construction in accordance with the preferred embodiment. This layer is preferably comprised of virgin PE, recycled PET fiber, or another synthetic fiber. For the best results, the upper fiber mat should preferably remain within the 300-450 g/sq m density range. It is anticipated that the density of the mat 34 can vary, however, in order to optimize the mat 34 for specific applications. Such optimization may include factors such as cost, mass, and/or acoustic performance. Since PE and PET fibers are hydrophobic, they tend to be quick drying and resist water saturation. This will reduce the potential for mold and mildew in the carpet system of the present invention. This upper fiber mat 34 layer provides additional higher frequency sound absorption than the layers that comprise typical carpet applications in use today and creates a de-coupler between the carpet and the vehicle body which means that it absorbs energy from the interior compartment of the vehicle. In other words, this insures that vibrational energy, which is a lower frequency noise, from the vehicle body is absorbed by this layer.

Figure 4:
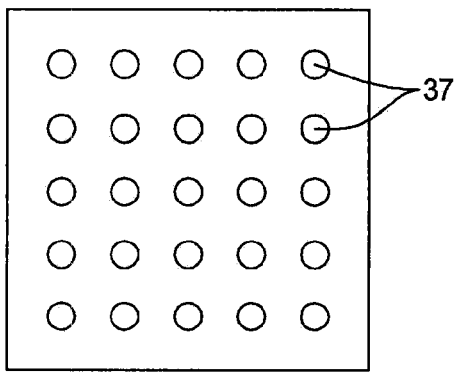
FIG. 4 is a partial top view of a perforated film layer of the present invention.

The fourth layer of the carpet construction of the preferred embodiment is a film layer 36 which is preferably a thin membrane or a perforated film. The film layer 36 is preferably between 1.0-4.5 mm thick but one skilled in the art will appreciate that this thickness may vary depending on the specific desired results and application without straying from the scope of the present disclosure. The film layer 36 preferably consists of polyamide, polyethylene, and/or polyester. Perforating the film layer 36 with a plurality of holes 37 (shown in FIGS. 2 and 4), which is preferred in the present invention, tends to further improve the absorptive qualities of the layer 36 in terms of sound absorption. The perforation hole 37 diameter and spacing have a significant influence on the sound absorption characteristics of the film layer 36. In accordance with the preferred embodiment of the present invention, perforation holes 37 preferably should not exceed 20% of the total surface area of the film layer 36. Research indicates that varying the hole 37 pattern provides varying benefit to sound absorption in the low to mid frequency ranges (1000-3000 Hz). Therefore, depending on the specific objectives of the application, it is anticipated that the hole pattern will be varied to accomplish the desired objective. This variation may occur between different carpet applications or even within the same film layer 43 such that in one carpet application, the hole 37 diameter and/or pattern may vary. Further, the perforated film layer 36 provides resistance to water intrusion through the carpet. Due to this resistance, the potential for water retention and the resulting mold, mildew, and rust in the vehicle body is greatly reduced by the present invention. Finally, the film layer 36 also acts as the adhesive system to bond the upper fiber mat 34 and the lower fiber mat 38.

The lower fiber mat 38 is the fifth layer of the preferred embodiment of the carpet system of the present invention. The lower fiber mat 38 is preferably comprised of the same types of materials as the upper mat 34, but the density of the lower fiber mat 38 may vary from that preferred for the upper mat 34. The lower fiber mat 38 achieves similar results and performs substantially similar functions as the upper mat 34.

Figure 3:
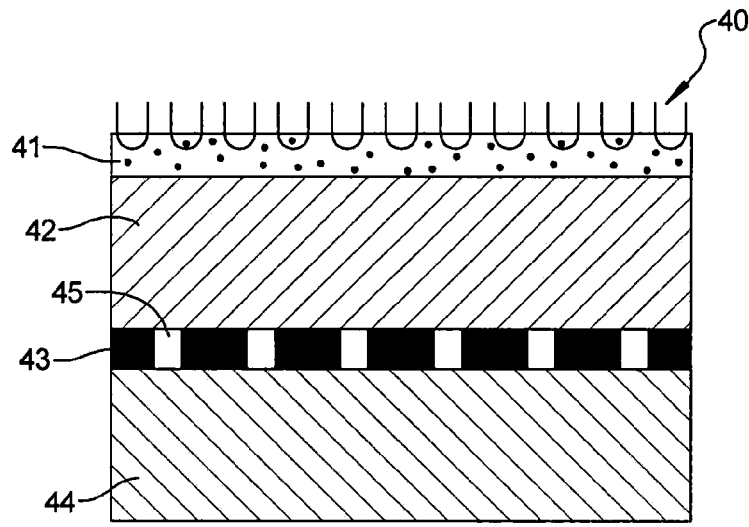
FIG. 3 is a cross sectional view of a second preferred embodiment of the present invention.

Referring now to FIG. 3, a second preferred embodiment of the present invention is illustrated. This embodiment generally consists of a carpet face 40, a primary backing 41, a back coating 42, a film layer 43, and an insulator pad 44.

In this embodiment of the present invention, carpet face 40 is typically constructed of either a non-woven needle-punch polyester such as PET, tufted nylon or tufted PET yarns. To achieve objects of recyclability, if preferred, PET yarns are preferably used. The carpet face 40 weights for the light-weight carpet construction disclosed herein preferably ranges from 280-450 g/sq m, but one skilled in the art will appreciate this range is not intended to be limiting and that the face weight may fall outside of this range without straying from the scope of the invention. This carpet face 40 provides the decorative appearance to the carpet system and contributes to the mid and higher frequency sound absorption of the interior.

The primary backing 41 is preferably the second layer of this embodiment of the carpet construction of this disclosure if the carpet face 40 is tufted. In the case that the carpet face 40 consists of tufted nylon or PET yarns, the fiber is typically woven through a primary backing 41 that usually consists of polyester, PET or another synthetic fiber blend. The tufted fibers of the carpet face 40 are secured to the primary backing 41 by a very thin porous back coating 41 that is preferably either latex, frothed PE, or acrylic latex. A thin membrane film layer 43 is then added to the tufted or non-tufted carpet. The film layer 43 construction is preferably between 1.0-4.5 mm thick, but the actual thickness of the film layer 43 may extend beyond this range without straying from the scope of this disclosure. The film layer 43 is preferably comprised of polyamide, polyethylene, and/or polyester.

This film layer 43 is preferably perforated with a plurality of substantially circular holes 45 to achieve the higher sound absorption within the vehicle compartment as it has been determined that such perforations improve the sound absorptive qualities of the layer 43. Specifically, the perforation hole 45 size diameter and spacing patterns of the perforation holes 45 can have a significant influence on the absorption characteristics of the film layer 43. As such, it is anticipated that the size of the perforation holes 45 and the spacing pattern of the same may be varied to accomplish the specific objects of the application. This variation may occur between different carpet applications or even within the same film layer 43 of one carpet application. Preferably, however, the hole 45 perforations should not exceed 20% of the total surface area of the film layer 43. The addition of the hole 45 patterns to the film layer has been shown to provide the greatest benefit in low to mid frequency ranges (1000-3000 Hz). In addition to providing benefit in these frequency ranges, the film layer 43 further provides resistance to water intrusion through the entire carpet system and as a result, reduces the potential for mold, mildew and rust in the vehicle body. Finally, the film layer 43 also acts as the adhesive system to bond the carpet face 40 to the preferred next layer of the carpet system—the insulator pad 44. As will be described below the composition of the insulator pad 44 may vary depending on the desired use of the carpet.

More specifically, the composition of the carpet padding insulator pad 44 will preferably depend on whether the carpet is being used in a floor mat or a foot-well insert area or whether it is being utilized as a secondary backing to a main floor carpet. In floor mat or foot-well insert applications ("A Zone" applications) where thicker and/or higher quality insulator pads 44 are desired, the pad 44 preferably comprises low density jute, felt, PET, or another synthetic fiber having a thickness of 4-10 mm. The pad 44 may also comprise an open cell PE or PU foam pad having a preferred thickness of 2-6 mm. As such, the insulator pad 44 provides beneficial acoustical absorption for the interior of the vehicle as well as provides an anti-slide surface in the foot-well areas so that the carpet does not easily slide around during normal use of the vehicle.

Alternatively, the insulator pad 44 may comprise a needled fleece. When the insulator pad 44 is comprised of needled fleece and the carpet is placed upon a nonwoven polyester or PET surface, a "locking" takes place which substantially improves the anti-slip functionality of the carpet system. For full floor carpet applications ("B Zone" applications), the main goal of the insulator pad 44 is to provide acoustic dampening and there is no need to provide an anti-slide feature. In such applications, the insulator pad 44 preferably comprises a highly lofted PET fiber pad although other materials may be used without straying from the scope of this disclosure.

Both embodiments of the present invention and the variations possible thereof are well suited for use in a modular carpet system such as that disclosed in PCT application PCT/US2007/061434 filed on Feb. 1, 2007, and published as WO2007/098311 which is incorporated by reference herein.

In both embodiments of the present invention as shown in FIG. 2 and FIG. 3, it is desired to keep the thickness of film layer 43 under 4.0 mm as testing has determined that if the film layer 43 gets too thick (greater than 4.0 to 4.5 mm), it will form and act as a barrier and not provide the acoustical benefit contemplated by the present invention. As for the preferred material forming the carpet system of the present invention, at this time PE seems to be the most economical and production feasible material to utilize as the film layer 43.

In addition to the improved sound dampening and other features of the carpet system of the present disclosure as described herein, the present invention achieves other considerations of the automotive industry. The carpet system as disclosed results in a low density, low weight carpet system that improves performance against water absorption, is highly recyclable, and is cost competitive with prior art carpet system. One skilled in the art will appreciate that the materials and specific ranges disclosed herein are for example only and may be varied without straying from the scope of the present invention. It is further anticipated that one or more layers may be added, omitted or moved in relation to the other layers. It is also anticipated that the materials used in each layer may be modified to achieve different objectives of a particular application or as new materials become more widely available. Further while this disclosure anticipates that the perforations in the film layer be substantially circular, any other shape is possible without straying from the scope of the invention. The layers of the preferred embodiments presented herein are for exemplary purposes only and may be mixed and matched and supplemented in various ways. Such modifications are deemed to be anticipated by this disclosure and hence not outside the scope of the present invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An acoustically enhanced carpet system comprising:
a face layer comprising tufted yarn;
a primary backing fiber blend mat disposed adjacent to the face layer;
a back coating layer disposed adjacent the primary backing, said back coating layer interlocked with the tufted yarn to prevent the face layer from becoming separated from the primary backing;

a thermoplastic film layer defining a plurality of perforations that form a regular perforation pattern, said film layer coupled to the backing coating layer, said film layer being between 1.0-4.5 mm thick; and an insulator pad disposed adjacent the film layer, wherein said film layer has a surface area and said perforations comprise less than 20% of said surface area of said film layer.

2. The carpet assembly of claim 1 wherein said film layer is an adhesive film for bonding.

3. The carpet assembly of claim 1 wherein said film layer is comprised of one of a polyamide, a polyethylene, and a polyester.

4. The carpet assembly of claim 1 wherein said perforations are substantially circular.

5. The carpet assembly of claim 1 wherein said perforation pattern provides acoustic absorption in the low to mid frequency ranges of 1000-3000 Hz.

6. The carpet assembly of claim 1 wherein said face layer is comprised of one of a polyester and a terephthalate (PET).

7. The carpet assembly of claim 1 wherein said face layer is tufted and comprised of one of a tufted nylon and a tufted PET.

8. The carpet assembly of claim 1 wherein said primary backing is comprised of one of a nylon, PET and a synthetic yarn.

9. The carpet assembly of claim 1 wherein said face layer has a face weight between 280-450 g/sq.m.

10. The carpet assembly of claim 1 wherein said back coating is one of a latex, a frothed polyethylene, an acrylic latex.

11. The carpet assembly of claim 1 wherein said back coating is under 340 g/sq.m.

12. A lightweight carpet assembly for improving acoustic absorption comprising:
a face layer comprising tufted yarn;
an insulator pad opposite said face layer;
a back coating in between said face layer and said insulator pad; and
a thermoplastic film layer in between said face layer and said insulator pad, said film layer defining a plurality of perforations that form a regular perforation pattern, wherein said film layer has a surface area and said perforations comprise less than 20% of said surface area of said film layer.

13. The carpet assembly of claim 12 wherein said film layer is an adhesive film for bonding and is comprised of one of a polyamide, a polyethylene, and a polyester.

14. The carpet assembly of claim 12 wherein said face layer is comprised of one of a tufted nylon and a tufted PET on a primary backing and wherein said back coating secures said one of a tufted nylon and a tufted PET to said primary backing.

15. The carpet assembly of claim 12 wherein said insulator pad is comprised of a needled fleece that when placed upon one of a nonwoven polyester and a PET surface provides an anti-slip feature.

* * * * *